Figure 5:
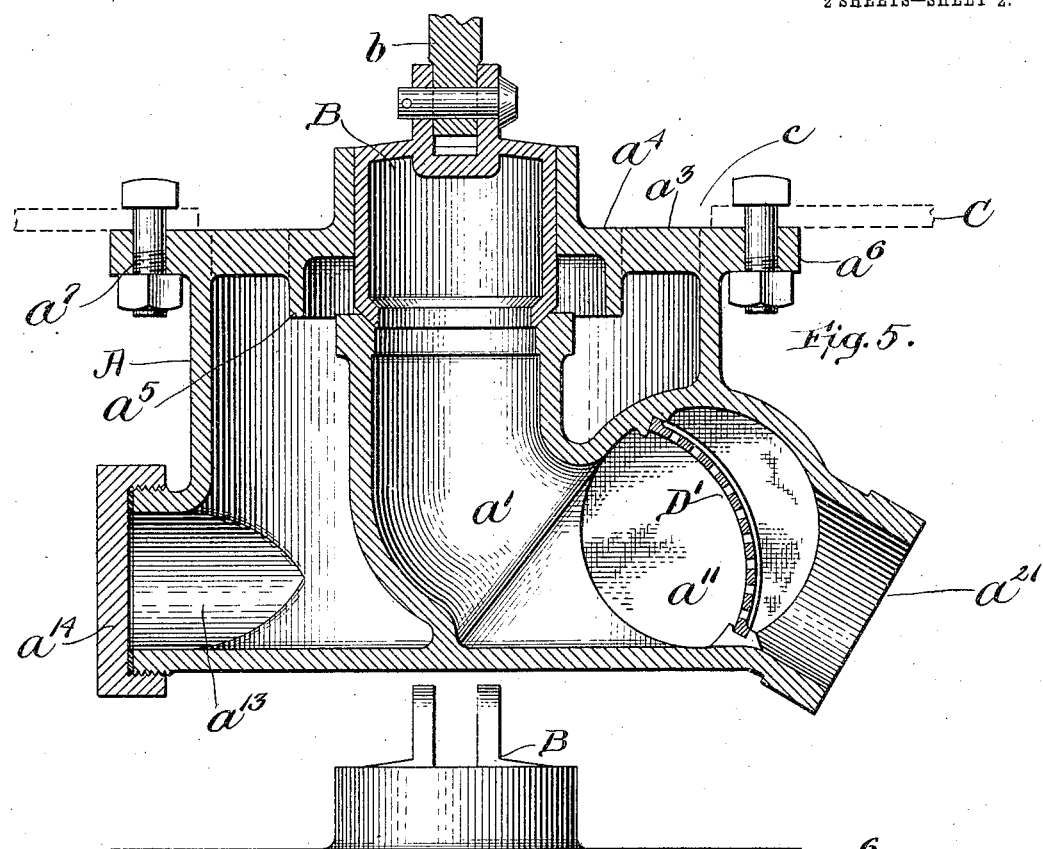

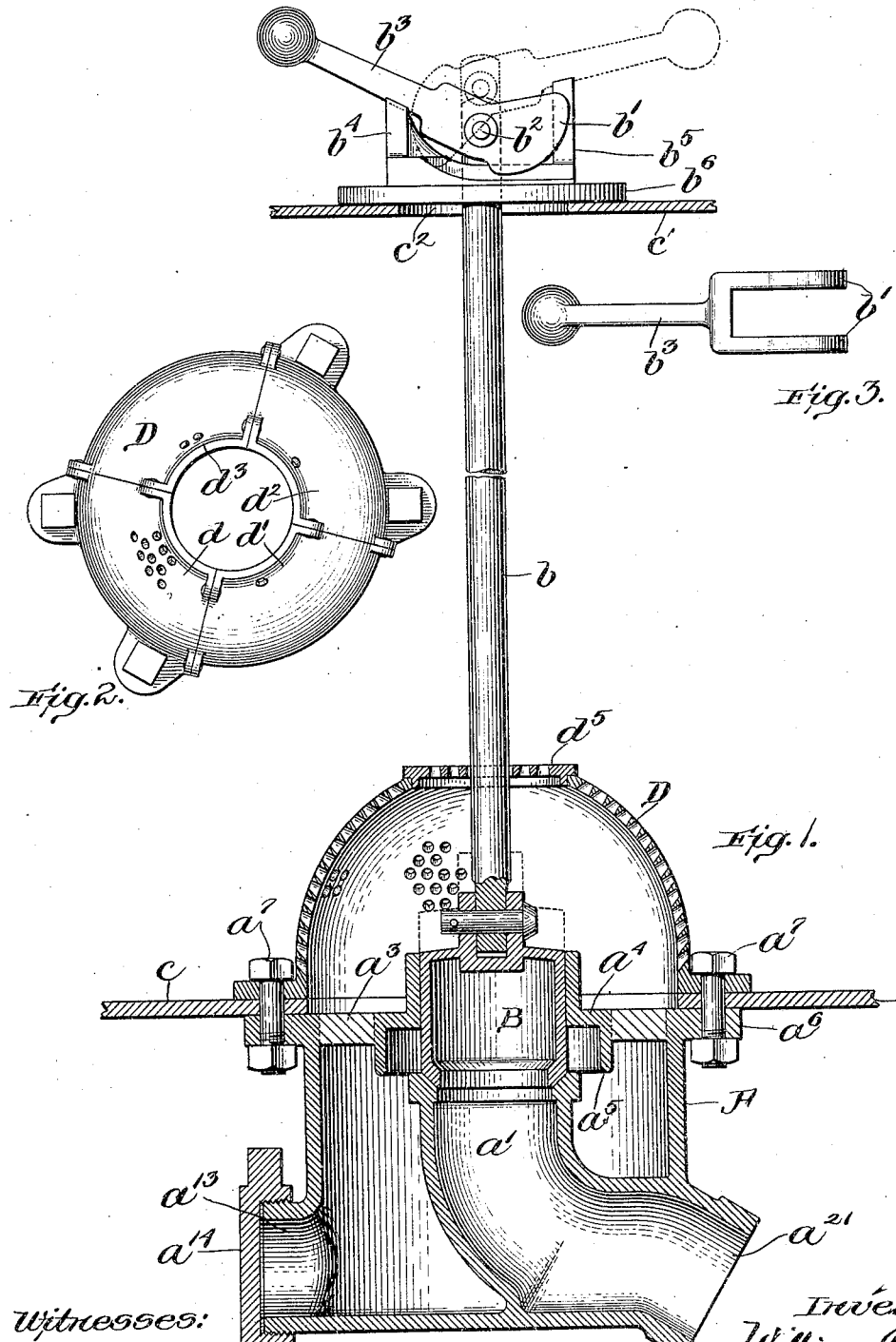

No. 790,743. PATENTED MAY 23, 1905.
W. R. PARK.
WATER CLEANSING DEVICE.
APPLICATION FILED OCT. 6, 1904.
2 SHEETS—SHEET 2.

Witnesses:
Joseph T. Brennan
Margaret N. Danher

Inventor:
William R. Park,
by Roberts & Mitchell,
Attorneys.

No. 790,743. Patented May 23, 1905.

UNITED STATES PATENT OFFICE.

WILLIAM R. PARK, OF TAUNTON, MASSACHUSETTS, ASSIGNOR, BY MESNE ASSIGNMENTS, TO THE UNITED INJECTOR COMPANY, A CORPORATION OF NEW YORK.

WATER-CLEANSING DEVICE.

SPECIFICATION forming part of Letters Patent No. 790,743, dated May 23, 1905.

Application filed October 6, 1904. Serial No. 227,339.

*To all whom it may concern:*

Be it known that I, WILLIAM R. PARK, a citizen of the United States, and a resident of Taunton, in the county of Bristol and State of Massachusetts, have invented new and useful Improvements in Water-Cleansing Devices, of which the following is a specification.

Upon steam-railroads it is necessary to replenish the water-supply of a locomotive from an open water-trough between the rails, from which the water is taken while the locomotive is in motion, and it is well known that quantities of cinders, grit, and the like collect in the trough and are taken up with the water and carried into the tank. In fact, however the water is fed to the tank cinders and grit will in one way or another enter the tank and not only injure the valve which controls the discharge from the tank and clog the discharge-conduit of the tank, but also injure the pump or injector.

My invention has for its object to provide a water-cleansing device to be used at the outlet of the water-tank, which will divert and separate the cinders, grit, and the like from the water as it passes from the tank, and my invention is a cleansing device comprising a vessel having an outlet adapted to be connected with the outlet-opening of a water-tank or the like and a reëntrant outlet, opposite the inner end of which is a hood which prevents the water passing directly from the inlet of the vessel to the mouth of the reëntrant outlet and causes the water to first enter the vessel far enough to pass the hood and then pass under the hood in order to reach the mouth of the reëntrant outlet. By this construction the cinder or grit particles, owing to their weight or to their momentum, or perhaps to both, are freed from the influence of the flowing water as its direction of flow is changed in passing under the hood and are left or trapped within the vessel, while the water is free to leave the vessel through the reëntrant outlet and escape to the pump or injector.

In the best form of my invention the inlet of the vessel is covered by a dome-like sieve or strainer, which not only prevents large particles of grit and large cinders from passing into the vessel, but owing to its shape these larger particles or cinders are shed to one side, so as not to clog the openings of the dome-like sieve. Also I preferably provide a valve which seats upon the inner end of the reëntrant outlet by which the passage of water through the vessel is controlled, and in connection with this valve I preferably provide a novel valve-operating means, hereinafter described, which constitutes a feature of my invention.

Figure 6:
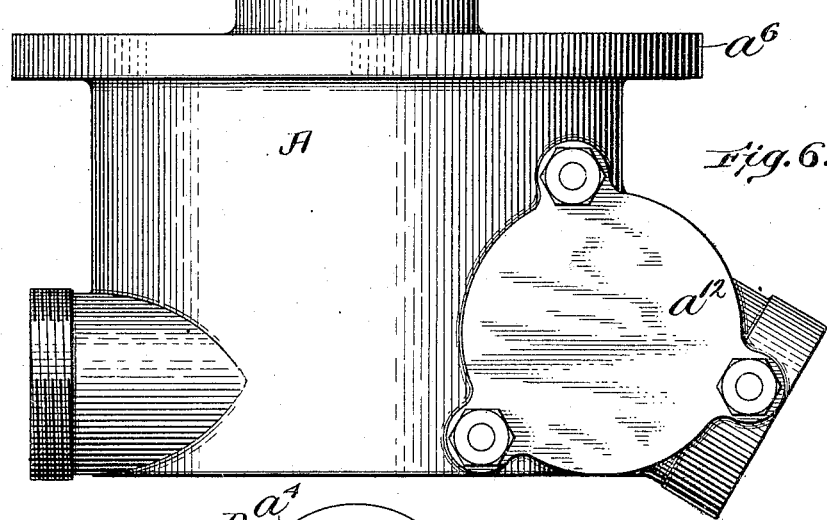
Figure 4:
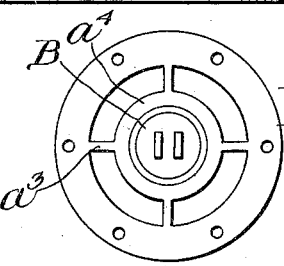

Figure 1 is an elevation, partly in section, of a water-cleansing device embodying one form of my invention. Fig. 2 is a plan view of the dome-shaped sieve hereinafter described. Fig. 3 is a detail of the cam hereinafter described. Fig. 4 is a plan view, upon reduced scale, of the vessel of the device shown in Figs. 1 and 2. Figs. 5 and 6 show another form of my invention.

Having reference to the drawings, A represents a vessel which may be more or less cylindrical in form. The open top of vessel A constitutes the inlet thereof, and $a'$ is the reëntrant outlet. The outlet $a'$ extends well up into the vessel A and terminates near the top thereof just below a spider $a^3$ integral with the rim of vessel A. The spider $a^3$ is made with a central annulus $a^4$, within which is mounted a vertically-movable valve B, which seats upon the mouth of outlet $a'$. This valve is connected by a rod $b$ with the valve-operating means, which is situated upon the top of the tank, where it can readily be reached and operated. Upon the under side of annulus $a^4$ is a depending skirt $a^5$, and this skirt, with valve B and annulus $a^4$, constitutes, when valve B is open, a hood or deflector interposed between the mouth of outlet $a'$ and the water as it enters the vessel.

Upon the exterior of the rim of vessel A is a flange $a^6$, adapted to be fastened by bolts $a^7$ to the bottom $c$ of the water-tank around the outlet thereof.

The stem $b$ at its upper end extends through the top $c'$ of the tank and upon the exterior of the latter carries a cam $b'$, pivotally connected to a stem $b^2$, so as to swing on an axis crosswise thereof. Cam $b'$ is made with a handle $b^3$, by means of which it can be swung from a position at one side of the stem to a position at the other side, as indicated by dotted lines. When handle $b^3$ is in the position shown by full lines, it is supported by a stop $b^4$, and when in its dotted-line position it engages and is supported by a stop $b^5$. These two stops $b^4$ $b^5$ project from a plate $b^6$, fixed to the top of the tank in a position to serve as an abutment for cam $b'$, so that when the latter is swung on pivot $b^2$ stem $b$ is moved endwise. Cam $b$ is so proportioned and shaped that when in its full-line position it is out of engagement with abutment $b^6$, and valve B is therefore closed tightly on its seat, and when in its dotted-line position the point of contact of said cam with abutment $b^6$ is off at one side of the stem $b$ while stop $b^5$ is in engagement with handle $b^3$ at the opposite side of said stem, and therefore valve B is supported and locked in its open position.

Covering the top or inlet of vessel A is a dome-shaped sieve D, which not only prevents large particles of grit or the like from passing into a vessel A, but owing to the incline of its exterior such particles are deflected to one side and prevented from clogging the openings of the dome D. In the drawings all of the perforations of the dome are not shown, but in practice such perforations would be distributed evenly throughout. Preferably I make the dome D of five pieces, four of which, $d$, $d'$, $d^2$, and $d^3$, are segments riveted together and fastened by the bolts $a^7$ to the bottom $c$ of the tank, and the other piece, $d^5$, is a cap closing the top of the dome and loosely surrounding the stem $b$, the purpose of this being to permit the valve B being removed through the opening closed by cap $d^5$ without removing the segments of the dome-shaped strainer. The opening $c^2$ in top of tank $c'$ under plate $b^6$ is large enough to permit of cap $d^5$ and valve B passing through. The dome-shaped strainer is made in segments to permit of casting with perforations in place of drilling, as would be necessary were the dome made all in one piece.

The outer end $a^{21}$ of outlet $a$ is adapted to be connected with the pump or injector by which the water from the tank C is delivered to the boiler of the locomotive.

When valve B is open and the injector or pump is working, water flows from the tank through dome D into vessel A and then under skirt $a^5$ to the mouth of the outlet $a'$, through which it passes to the pump or injector. In passing through dome D the heavier cinders or particles of grit are held back, while in passing through vessel A those particles which have passed dome D are trapped and held in the lower part of said vessel.

Vessel A is cleaned by removing cap $a^{14}$, which normally closes opening $a^{13}$.

In Figs. 5 and 6 the outlet $a'$ is made with the chamber $a^{11}$ to receive a screen D', placed within or removed from said chamber through a clean-out opening at one side of the latter, said opening being closed by a removable cover $a^{12}$.

It will be plain from the above that the lower portion of vessel A constitutes a chamber which is at one side of the direct path between the inlet and the outlet of vessel A and that the hood or deflector is interposed between the inlet and directs or deflects the entering water toward said chamber, thereby causing cinders and grit to enter and lodge therein.

It is common to place a screen in the pipe connecting the water-tank with the pump or injector; but it has heretofore been necessary to frequently clean out the matter collected by the screen. With my device, however, practically all of the cinders, grit, and like which pass dome D will be collected in vessel A out of the path of the water, so that it is not necessary to clean out so frequently as heretofore. Moreover, the flow of water is not checked by accumulations in vessel A nor so much, as heretofore, by the accumulations in chamber $a^{11}$.

What I claim is—

1. In a device of the character described, a vessel having a perforated top and central annulus with a depending skirt thereon, a reentrant outlet with its mouth under the skirt, a valve sliding in the annulus to control the outlet, and means extending from the valve to operate the same.

2. The combination of a trap vessel having an apertured top and reëntrant outlet, of a valve for the outlet sliding in a bearing in the vessel-top and adapted to be inserted in the said bearing from the outside of the vessel.

3. The combination with a trap vessel having an apertured top and reëntrant outlet, of a valve for the outlet sliding in a bearing in the vessel-top and adapted to be inserted in the said bearing from the outside of the vessel, a strainer-dome over the valve having space therein to accommodate the valve when lifted, and valve-operating means extending through the strainer-dome.

Signed by me at Boston, Massachusetts, this 29th day of September, 1904.

WILLIAM R. PARK.

Witnesses:
 JOSEPH T. BRENNAN,
 GRACE E. GIBBONS.